(12) United States Patent
Keller et al.

(10) Patent No.: US 8,771,771 B2
(45) Date of Patent: Jul. 8, 2014

(54) FOOD COMPOSITION PREPARED BY A STERILIZATION PROCESS

(75) Inventors: Scott Wayne Keller, Cincinati, OH (US); Dean Larry DuVal, Lebanon, OH (US); Raul Victorino Nunes, Loveland, OH (US)

(73) Assignee: The Iams Company, Cincinnati, OH (US)

( * ) Notice: Subject to any disclaimer, the term of this patent is extended or adjusted under 35 U.S.C. 154(b) by 0 days.

(21) Appl. No.: 12/795,050

(22) Filed: Jun. 7, 2010

(65) Prior Publication Data

US 2010/0291270 A1 Nov. 18, 2010

Related U.S. Application Data

(63) Continuation of application No. 11/787,742, filed on Apr. 17, 2007, now abandoned.

(60) Provisional application No. 60/792,561, filed on Apr. 17, 2006.

(51) Int. Cl.
| | | |
|---|---|---|
| *A23L 3/32* | (2006.01) | |
| *A23B 4/01* | (2006.01) | |
| *H05B 3/34* | (2006.01) | |
| *A23L 3/005* | (2006.01) | |
| *A23L 1/01* | (2006.01) | |

(52) U.S. Cl.
CPC .......... *H05B 3/342* (2013.01); *H05B 2203/017* (2013.01); *A23B 4/01* (2013.01); *A23L 3/32* (2013.01); *A23L 3/005* (2013.01); *A23L 1/0128* (2013.01); *Y10S 426/805* (2013.01)
USPC ........... 426/237; 426/238; 426/244; 426/521; 426/805

(58) Field of Classification Search
USPC ............. 426/237, 238, 244, 521, 805; 99/358
See application file for complete search history.

(56) References Cited

U.S. PATENT DOCUMENTS

| | | | | |
|---|---|---|---|---|
| 4,804,551 A | * | 2/1989 | Matthews et al. | 426/518 |
| 5,085,882 A | * | 2/1992 | Rausing | 426/524 |

(Continued)

FOREIGN PATENT DOCUMENTS

| | | |
|---|---|---|
| EP | 0866667 B1 | 9/1998 |
| EP | 0 654 724 A | 9/1999 |

(Continued)

OTHER PUBLICATIONS

Chunky Beef and Vegetable Soup NPL, Jan. 2004, http://www.epicurious.com/recipes/food/views/Chunky-Beef-and-Vegetable-Soup-109018.*

(Continued)

*Primary Examiner* — Drew Becker
*Assistant Examiner* — Preston Smith
(74) *Attorney, Agent, or Firm* — Amy M. Foust (57) ABSTRACT

The present invention relates to a food composition prepared by a method of sterilizing. More specifically to a sterilizing process designed to be used in an aseptic process that comprises the steps of transferring said food composition into a heating unit; passing an electric current through said composition; maintaining a power to mass flow rate range through said heating unit from about 125 kJoules/kg to about 750 kJoules/kg; adjusting a flow rate to maintain said food composition temperature exiting the heating unit from about 75° C. to about 175° C.; and cooling said food composition to a final temperature from about 5° C. to 100° C.

16 Claims, 6 Drawing Sheets

(56) References Cited

U.S. PATENT DOCUMENTS

| | | | |
|---|---|---|---|
| 5,417,991 A * | 5/1995 | Green | 426/241 |
| 5,514,391 A * | 5/1996 | Bushnell et al. | 426/237 |
| 5,555,702 A * | 9/1996 | Sizer | 53/127 |
| 5,670,199 A * | 9/1997 | Swartzel et al. | 426/614 |
| 5,758,015 A | 5/1998 | Polny, Jr. | |
| 5,802,961 A | 9/1998 | Hay et al. | |
| 5,829,224 A | 11/1998 | Sizer | |
| 5,972,405 A | 10/1999 | Sizer | |
| 6,096,354 A | 8/2000 | Albrecht | |
| 6,096,356 A | 8/2000 | Albrecht | |
| 6,120,824 A | 9/2000 | Mendez | |
| 6,207,215 B1 | 3/2001 | Wilson et al. | |
| 6,410,079 B2 | 6/2002 | Cheuk et al. | |
| 6,543,339 B1 | 4/2003 | Albrecht | |
| 6,787,105 B2 * | 9/2004 | Robbins | 422/22 |
| 2002/0117165 A1 * | 8/2002 | Turner | 126/299 R |
| 2005/0031751 A1 | 2/2005 | Weng et al. | |

FOREIGN PATENT DOCUMENTS

| | | |
|---|---|---|
| WO | WO 93/04421 A1 | 3/1993 |
| WO | WO 98/30451 | 8/2000 |
| WO | WO 2004/017741 A1 | 3/2004 |
| WO | WO 2007/027109 A1 | 3/2007 |

OTHER PUBLICATIONS

Parrott, D.L., "Use of Ohmic Heating for Aseptic Processing of Food Particulates", Food Technology, Dec. 1992, pp. 68-72.

Palaniappan, et al., "Electrical Conductivity of Selected Juices: Influences of Temperature, Solids Content, Applied Voltage and Particle Size", Journal of Food Process Engineering, vol. 14 (1991), pp. 247-260.

Sarang et al., "Ohmic Heating for Thermal Processing of Low-Acid Foods Containing Solid Particulates", Dissertation presented to Ohio State University 2007, 170 pages.

Steffe, J.F., Rheological Methods in Food Process Engineering:, Freeman Press (1996) pp. 366-370.

Dinnage, D.F., "Continuous Aseptic Processing Using the Ohmic Heating Process", Changing Food Technology, 2011.

Decio, Pierluigi, "A New Ohmic Concept for High Quality Fruit Preparations and Desserts Containing Pieces," Fruit Processing, 2003, vol. 13, No. 2, pp. 110-113.

Kim, H. J., et al., "Microbiological and Chemical Investigation of Ohmic Heating of Particulate Foods Using a 5 kW Ohmic System," Journal of Food Processing and Preservation, 1996, vol. 20, No. 1, pp. 41-58.

Reznick, David, "Ohmic Heating of Fluid Foods Various Parameters Affect the Performance of Ohmic Heating Devices Used to Heat Fluid Food Products," Food Technology, Institute of Food Technologist, 1996, vol. 50, No. 5, pp. 250-251.

Flow Properties of Fruit Fillings—Y. P. Wei, C. S. Wang and J. S. B. Wu—1pg.

Ohmic Processing—Diagram of a Meatball System—H. J. Kim, et al.; XP009088437 p. 44-1 pg.

S. Sarang et al. "Product Formulation for Ohmic Heating: Blanching as a Pretreatment Method to Improve Uniformity in Heating of Solid-Liquid Food Mixtures", Journal of Food Science, vol. 72, No. 5, 2007.

Unilever Patent Group, FOPN 7108—Notice of Opposition to a European Patent, Aug. 11, 2011-16 pages.

* cited by examiner

Fig. 9

FOOD COMPOSITION PREPARED BY A STERILIZATION PROCESS

CROSS REFERENCE TO RELATED APPLICATIONS

This application is a continuation application of U.S. application Ser. No. 11/787,742, filed Apr. 17, 2007, now abandoned, which claims the benefit of and priority to U.S. Provisional No. 60/792,561, filed Apr. 17, 2006.

FIELD OF THE INVENTION

The present invention relates to a food composition prepared by a method of sterilizing. More specifically to a sterilizing process designed to be used in an aseptic process that comprises the steps of: introducing a food composition to an initial temperature from about 1.5° C. to about 100° C.; transferring said food composition into a heating unit; passing an electric current through said composition; maintaining a power to mass flow rate range through said heating unit from about 125 kJoules/kg to about 750 kJoules/kg; adjusting a flow rate to maintain said food composition temperature exiting the heating unit from about 75° C. to about 175° C.; and cooling said food composition to a final temperature from about 5° C. to 100° C.

BACKGROUND OF THE INVENTION

A conventional method of sterilization of low acid foods involves heat sufficient to penetrate through the package to the slowest heating point or cold spot of the packaged food product. Once the cold spot of the package reaches the target for a prescribe length of time, sterility is achieved. Heat sufficient for penetration is delivered using but not limited to a retort process which produces and contains steam saturated air, steam water spray, steam and hot water immersion. Some disadvantages of the retort food sterilization process results in high heat exposure to product at the product package interface, and lower heat expose at the cold spot of the package, therefore creating a non-uniformity of heat distribution which prevents sterilization of heterogeneous mixtures and foods having large particles. With conventional heating, the larger the particle, the more time is required to heat its center to the sterilization temperature. Because of this disadvantage, the complete thermal processing (sterilization) of all of the particles in a food which include large particles, small particles, heterogeneous material, and homogenous materials is not present.

While much effort has been made to produce a food composition that is aseptically sterilized, the need still remains for a food composition containing large particles, small particles, heterogeneous materials, and homogeneous materials that is sterilized by a rapid and immediate product heating that heats from the inside-out, while still preserving food properties.

Ohmic heating is a food processing method in which an alternating electrical current is passed through a food sample. This results in heat generation to a food ample. The process utilizes different physical properties of a composition or particles to uniformly heat the composition or particle. This results in internal energy generation in foods. Ohmic heating reduces heat exposure by dramatically reducing the time it takes to bring a food product up to sterilization temperature. In addition to heating rapidly, ohmic heating heats particles large or small as quickly as fluids provided they have similar electro-conductivity properties. In some cases, particles heat even more rapidly. Ohmic heating allows more even heating of the entire system and the opportunity to formulate products with larger particles.

It is therefore an object of the present invention to provide a food composition prepared by a method of sterilization, preferably ohmic heating, in which all of the solid food pieces in the food composition including large particles, small particles, particulates, heterogeneous material, and homogenous material as well as filler are commercially sterilized.

SUMMARY OF THE INVENTION

The present invention relates to a food composition prepared by a method of sterilizing. More specifically to a sterilizing process designed to be used in an aseptic process that comprises the steps of: introducing a food composition to an initial temperature from about 1.5° C. to about 100° C.; transferring said food composition into a heating unit; passing an electric current through said composition; maintaining a power to mass flow rate range through said heating unit from about 125 kJoules/kg to about 750 kJoules/kg; adjusting a flow rate to maintain said food composition temperature exiting the heating unit from about 75° C. to about 175° C.; and cooling said food composition to a final temperature from about 5° C. to 100° C.

The present invention further relates to a food composition prepared by a method of sterilizing comprising the steps of: providing a food composition; passing an electric current through said composition; maintaining a power to mass flow rate range through a heating unit by adjusting the electric current; and wherein said composition has Density of from about 0.85 g/ml to about 1.15 g/ml; and said composition has a Electro-conductivity from about 0.5 Siemens/m to about 9.0 Siemens/m.

The present invention further relates to a food composition prepared by a method of sterilizing comprising the steps of: providing a food composition; passing an electric current through said composition; maintaining a power to mass flow rate range through a heating unit by adjusting the electric current; and wherein said composition further comprises a filler having a Electro-conductivity from about 0.5 Siemens/m to about 9.0 Siemens/m and a Consistency Value (K) from about 0.01 to about 1000 Pa-s".

DETAILED DESCRIPTION OF THE INVENTION

The present invention comprises a food composition prepared by a method of sterilizing. More specifically to a sterilizing process designed to be used in an aseptic process that comprises the steps of: introducing a food composition to an initial temperature from about 1.5° C. to about 100° C.; transferring said food composition into a heating unit; passing an electric current through said composition; maintaining a power to mass flow rate range through said heating unit from about 125 kJoules/kg to about 750 kJoules/kg; adjusting a flow rate to maintain said food composition temperature exiting the heating unit from about 75° C. to about 175° C.; and cooling said food composition to a final temperature from about 5° C. to 100° C.

These and other limitations of the compositions and methods of the present invention, as well as many of the optional ingredients suitable for use herein, are described in detail hereinafter.

As used herein, the term "adapted for use" means that the pet food products described can meet the American Association of Feed Control Officials (AAFCO) safety requirements for providing pet food products for a pet as may be amended from time to time.

As used herein, the term "companion animal" means a domestic animal preferably including (for example) dogs, cats, horses, cows, pigs, rabbits, and the like. Domestic dogs and cats are particularly preferred.

The term "complete and nutritionally balanced" as used herein, unless otherwise specified, refers to a pet food product having all known required nutrients in proper amounts and proportions based upon the recommendation of recognized authorities in the field of pet nutrition.

As used herein, the term "composite material", refers to food compositions made up of one or more ingredients that have been mixed together and subsequently formed into a solid food pieces.

As used herein, the term "filler" refers to a solid, liquid, or gas that is used to occupy the volume around or within the solid food pieces within a food composition package.

As used herein, the term "finished product", refers to the food composition in a package.

As used herein, the term, "heterogeneous", means solid food pieces of non-uniform shape, geometry, size, density, mass, consistency, or other physical properties.

As used herein, the term, "homogenous", means solid food pieces of uniform shape, geometry, size, density, mass, consistency, or other physical properties.

As used herein, the term "ingredient batch" refers to a set of composite materials that are added together in known amounts or ratios to create solid food pieces. This solid food pieces is subsequently processed to create the food composition.

As used herein, the term "large particles" refers to a solid food piece with a volume from about 2 ml to 16 ml.

As used herein, the term "mixing system" refers to the process where liquid ingredients and combinations of liquids and solid food pieces are mixed together to create the food composition.

As used herein, the term "ohmic heating unit" refers to a specific type of equipment used in a sterilization system. The "ohmic heating unit" passes an electrical current through product to be sterilized, and utilizes the electrical resistance of the food composition to generate heat sufficient to achieve effective microbe kill.

As used herein, the term "package sterilization" refers to the process of treating the food containing package to achieve at least about a 6 log reduction in microbial activity on all surfaces of the package. This treatment can be, but is not limited to chemical, thermal, radiation, light, or pressure treatments.

As used herein, the term "particulates" refers to a solid food piece with a volume from about 0.001 ml to about 0.027 ml.

As used herein, the term, "pet composition" means a food composition that can be ingested by a companion animal, supplements for a companion animal, treats, biscuits, chews, and combinations thereof. The pet composition can be wet and/or dry.

As used herein, the term "piece-forming operation" refers to a process that combines one or more ingredients together to form a solid food piece.

As used herein, the term "product", refers to the food composition either in or independent of a package.

As used herein, the term "recirculation" refers to a component of the food processing system following the sterilization system that detects processing errors, such as low temperatures, low residence times, excess particle sizes, clumping, etc. wherein established control parameters have been exceeded, or not achieved.

As used herein, the term "rework material" refers to food compositions that either exceeded or did not meet required processing conditions. This rework material is recirculated back through the sterilization process to complete the sterilization process.

As used herein, the term "small particles" refers to a solid food piece with a volume from about 0.027 ml to about 2 ml.

As used herein, the term "sterilization system" refers to the process of thermally treating the food composition to achieve at least about a 9 log reduction in microbial spore activity or viability. This is typically referred to as "commercial sterility" within the food industry.

As used herein the term "wet" food compositions means the food compositions can be moist and/or semi-moist.

All percentages, parts and ratios as used herein are by weight of the total product, unless otherwise specified. All such weights as they pertain to listed ingredients are based on the active level and, therefore do not include solvents or by-products that may be included in commercially available materials, unless otherwise specified.

The food composition and methods of the present invention can comprise, consist of, or consist essentially of, the essential elements and limitations of the invention described herein, as well as any additional or optional ingredients, components, or limitations described herein or otherwise useful in food composition intended for animal or human consumption.

Composition Form

The food composition of the present invention can be in the form of a pet composition and/or human composition. The food composition can comprise a composite material. The composite material can comprise one or more ingredients that have been mixed together to form solid food pieces. The solid food pieces can be large particles, small particles and/or particulates. The solid food pieces can be heterogeneous and/or homogenous. The food composition can additionally comprise a filler. The food composition can be a ready-to-eat food, baby food, snack, treats, kibbles, pates, processed meats such as hot dogs, sausages, meatballs, and combinations thereof. The food compositions can have a specific gravity from about 0.85 to about 1.25.

The food composition comprising composite material comprising solid food pieces can have a shape selected from the group consisting of cube, spherical, geometric, axially elongated, rectangular, strings, shreds, slices, flakes and combinations thereof.

The food composition can have a Density from about 0.85 g/ml to about 1.15 g/ml, from about 0.9 g/ml to about 1.1 g/ml, from about 0.95 g/ml to about 1.05 g/ml, from about 0.97 g/ml to about 1.03 g/ml, as measured by the Density Method described hereafter.

The food composition can have an Electro-conductivity. The Electro-conductivity is from about 0.5 siemens/M to about 9.0 Siemens/m, from about 0.7 Siemens/m to about 7.0 Siemens/m, from about 0.9 Siemens/m to about 5.0 Siemens/m, from about 1.0 Siemens/m to about 2.4 Siemens/m, from about 1.1 Siemens/m to about 2.0 Siemens/m, from about 1.2 Siemens/m to about 1.7 Siemens/m, as measured by the Electro-conductivity Method described herein.

In one embodiment, the food composition is in the form of wet pet food composition. The wet pet food compositions of the present invention can be a semi-moist pet food composition (i.e. those having a total moisture content of from 16% to 50%, by weight of the composition), and/or a moist pet food compositions (i.e. those having a total moisture content of greater than 50%, by weight of the composition). Unless otherwise described herein, semi-moist pet food composition, and moist pet food compositions are not limited by their composition or method of preparation. In another embodiment the pet food composition is dry (i.e. those having a total moisture content of less than 16%, by weight of the composition).

The pet food composition can comprise a continuous matrix that can comprise a filler. The pet food composition can comprise a discontinuous matrix that can comprise a composite material. The pet food composition herein can be complete and nutritionally balanced. A complete and nutritionally balanced pet food composition may be compounded to be fed as the sole ration and is capable of maintaining the life and/or promote reproduction without any additional substance being consumed, except for water.

In one embodiment, the food composition is in the form of baby food composition. The baby food composition of the present invention can be a semi-moist baby food composition s (i.e. those having a total moisture content of from 16% to 50%, by weight of the composition, and/or a moist baby food composition s (i.e. those having a total moisture content of greater than 50%, by weight of the composition). The baby food composition can comprise a continuous matrix that can comprise a filler. The baby food composition can comprise a discontinuous matrix that can comprise a composite material.

Composite Material

The food composition can comprise a composite material. The composite material can comprise one or more ingredients that have been mixed together to form solid food pieces. The solid food pieces can be large particles, small particles and/or particulates. The solid food pieces can be heterogeneous and/or homogenous. The composite material can have a Volume from about 0.001 ml to about 16 ml, from about 0.008 ml to about 12 ml, from about 0.064 ml, to about 8 ml, from about 0.125 ml to about 4 ml, from about 0.25 ml to about 2 ml, as measured by the Volume Method described hereafter.

The large particles have a volume from about 2 ml to about 16 ml, from about 2.5 ml to about 8 ml, from about 3 ml to about 4 ml, as measured by the Volume Method described hereafter.

The small particles have a volume from about 0.2 ml to about 2 ml, from about 0.3 ml to about 1.5 ml, from about 0.3 ml to about 1 ml, from about 0.4 ml to about 0.8 ml, as measured by the Volume Method described hereafter.

The particulates have a volume from about 0.001 ml to about 0.2 ml, from about 0.01 ml to about 0.175 ml, from about 0.025 ml to about 0.15 ml, from about 0.064 ml to about 0.125 ml, as measured by the Volume Method described hereafter.

The composite material can have a Density from about 0.85 g/ml to about 1.15 g/ml, from about 0.9 g/ml to about 1.1 g/ml, from about 0.95 g/ml to about 1.05 g/ml, from about 0.97 g/ml to about 1.03 g/ml, as measured by the Density Method described hereafter.

The composite material comprising solid food pieces can have a shape selected from the group consisting of cube, spherical, geometric, axially elongated, rectangular, strings, shreds, slices, flakes and combinations thereof.

The composite material is selected from the group consisting of animal protein, plant protein, farinaceous matter, vegetables, fruits, dough, fat, oils, binding agents, and combinations thereof.

The animal protein may be derived from any of a variety of animal sources including, for example, muscle meat or meat by-product. Nonlimiting examples of animal protein include beef, pork, poultry, lamb, kangaroo, shell fish, crustaceans, fish, and combinations thereof including, for example, muscle meat, meat by-product, meat meal or fish meal.

The plant protein may be derived from any of a variety of plant sources. Nonlimiting examples of plant protein include lupin protein, wheat protein, soy protein, and combinations thereof.

The farinaceous matter may be derived from any of a variety of farinaceous matter sources. Nonlimiting examples of farinaceous matter include grains such as, rice, corn, milo, sorghum, barley, and wheat, and the like, pasta (for example, ground pasta), breading, and combinations thereof.

Vegetables may be derived from any of a variety of vegetable sources. Nonlimiting examples of vegetables include peas, carrots, corn, potatoes, beans, cabbage, tomatoes, celery, broccoli, cauliflower, and leeks.

Fruits may be derived from any of a variety of fruit sources. Nonlimiting examples include tomatoes, apples, avocado, pears, peaches, cherries, apricots, plums, grapes, oranges, grapefruit, lemons, limes, cranberries, raspberries, blueberries, watermelon, cantaloupe, muskmelon, honeydew melon, strawberries, banana, and combinations thereof.

Dough may be derived from any of a variety of dough sources. Nonlimiting examples include wheat dough, corn dough, potato dough, soybean dough, rice dough, and combinations thereof.

Fat may be derived from any of a variety of fat sources. Nonlimiting examples include chicken fat, beef fat, pork fat, and combinations thereof.

Oils may be derived from any of a variety of oil sources. Nonlimiting examples include fish oil, corn oil, canola oil, palm oil, canola oil, and combinations thereof.

Binding agents may be derived from any of a variety of binding agents. Nonlimiting examples of binders include egg-based materials (including egg whites and preferably dried egg whites), undenatured proteins, food grade polymeric adhesives, gels, polyols, starches (including modified starches), gums, and mixtures thereof.

Nonlimiting examples of polyols include sugar alcohols such as disaccharides and complex carbohydrates. Certain complex carbohydrates are referred commonly as starches. Disaccharides are molecules having the general formula $C_nH_{2n-2}O_{n-1}$, wherein the disaccharide has 2 monosaccharide units connected via a glycosidic bond. In such formula, n is an integer equal to or greater than 3.

Nonlimiting examples of disaccharides which may be utilized herein include sucrose, maltose, lactitol, maltitol, maltulose, and lactose.

Nonlimiting examples of complex carbohydrates include oligosaccharides and polysaccharides. As used herein, the term "oligosaccharide" means a molecule having from 3 to 9 monosaccharide units, wherein the units are covalently connected via glycosidic bonds. As used herein, the term "polysaccharide" means a macromolecule having greater than 9 monosaccharide units, wherein the units are covalently connected via glycosidic bonds. The polysaccharides may be linear chains or branched. Preferably, the polysaccharide has from 9 to about 20 monosaccharide units. Polysaccharides may include starches, which is defined herein to include starches and modified starches. Starches are generally carbohydrate polymers occurring in certain plant species, for example, cereals and tubers, such as corn, wheat, rice, tapioca, potato, pea, and the like. Starches contain linked alpha-D-glucose units. Starches may have either a mainly linear structure (e.g., amylose) or a branched structure (e.g., amylopectin). Starches may be modified by cross-linking to prevent excessive swelling of the starch granules using methods well-known to those skilled in the art. Additional examples of starches include potato starch, corn starch, and the like. Other examples of commercially available starches include ULTRA SPERSE M™, N-LITE LP™, and TEXTRA PLUS™, all available from National Starch and Chemical Company, Bridgewater, N.J. Nonlimiting examples of preferred complex carbohydrates include raffinose, stachyoses, maltotriose, maltotetraose, glycogen, amylose, amylopectin, polydextrose, and maltodextrin.

Filler

The food composition of the present invention can comprise a continuous matrix that can comprise a filler. The filler can be a solid, a liquid or packed air. The filler can be reversible (for example thermo-reversible including gelatin) and/or irreversible (for example thermo-irreversible including egg white). Nonlimiting examples of the filler include gravy, gel, jelly, aspic, sauce, water, gas (for example including nitrogen, carbon dioxide, and atmospheric air), broth, extracts, brine, soup, steam, and combinations thereof.

The filler can have an Electro-conductivity. The Electro-conductivity is from about 0.5 Siemens/m to about 9.0 Siemens/m, from about 0.7 Siemens/m to about 7.0 Siemens/m, from about 0.9 Siemens/m to about 5.0 Siemens/m, from about 1.0 Siemens/m to about 2.4 Siemens/m, from about 1.1 Siemens/m to about 2.0 Siemens/m, from about 1.2 Siemens/m to about 1.7 Siemens/m, as measured by the Electro-conductivity Method described herein.

When the filler is liquid, the Consistency Value (K) is from about 0.01 to about 1000 Pa-s$^n$, from about 0.02 to about 600 Pa-s$^n$, from about 0.1 to about 400 Pa-s$^n$, from about 0.2 to about 100 Pa-s$^n$, from about 0.3 to about 13 Pa-s$^n$, as measured by the Viscosity Method described hereafter.

When the filler is liquid, the Shear Index (n) is from about 0.001 to about 4, where n is dimensionless, from about 0.01 to about 3, from about 0.1 to about 2, from about 0.2 to about 1, as measured by the Viscosity Method described hereafter.

The filler can optionally further comprise an additional component. Nonlimiting examples of additional components include wheat protein, soy protein, lupin protein, protein flour, textured wheat protein, textured soy protein, textured lupin protein, textured vegetable protein, breading, comminuted meat, flour, comminuted pasta, pasta, water, flavorants, starches, seasoning salts, colorants, time-release compounds, minerals, vitamins, antioxidants, prebiotics, probiotics, aroma modifiers, flavor modifiers, and combinations thereof.

Method of Sterilization

The food composition of the present invention is preferably sterilized by a sterilizing process designed to be used in an aseptic process. The sterilizing process is preferably Ohmic heating and preferably includes the steps of 1) introducing a food composition to an initial temperature from about 1.5° C. to about 100° C.; 2) transferring said food composition into an heating unit; 3) passing an electric current through said composition; 4) maintaining a power to mass flow rate range through said heating unit from about 125 kJoules/kg to about 750 kJoules/kg; 5) adjusting a flow rate to maintain said food composition temperature exiting the heating unit from about 75° C. to about 175° C.; and 6) cooling said food composition to a final temperature from about 5° C. to 100° C.

The amount of heat transferred to the product is governed by the following Heat Equation:

$$Q = \text{FlowRate} * d * c_p * (T_{out} - T_{in})$$

where,

Q is the amount of heat transferred to the product (kW),
d is the density (g/ml),
$c_p$ (kJ/Kg° C.) is the heat capacity of the material, and
$T_{out}$ and $T_{in}$ are the inlet and exit temperature from the heating unit (° C.).

The previous equation can be rearranged to the following equation to evaluate the Power per Mass Flow Rate (kJ/kg):

$$\frac{\text{Power}}{\text{MassFlowRate}} = c_p * (T_{out} - T_{in})$$

The value of this equation is that it directly calculates the energy input required per unit mass in order to obtain a desired temperature increase, assuming the heat capacity of the material is known. The heating unit power to mass flow rate range is from about 125 kJoules/kg to about 750 kJoules/kg, from about 200 kJoules/kg to about 600 kJoules/kg, from about 300 kJoules/kg to about 500 kJoules/kg, and from about 350 kJoules/kg to about 460 kJoules/kg using the Equation described above.

Optionally, the electric current can be maintained and the wattage range can be adjusted.

The wattage range is preferably from about 1 KW to about 75 KW for each heating unit.

Figure 1:
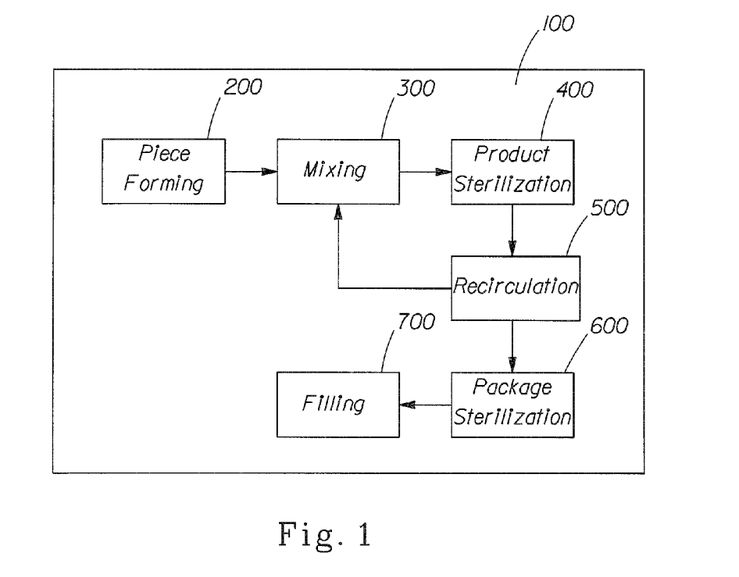
FIG. 1 is a block diagram of the overall method of sterilizing a food composition.

Referring to FIG. 1 method 100 consists of at least 6 operations diagramed as block operations in FIG. 1.

Figure 2:
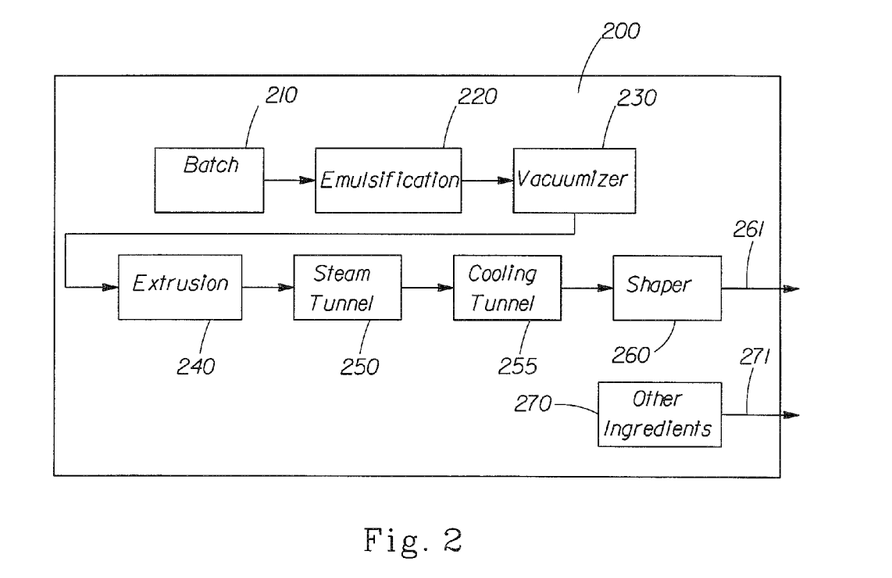
FIG. 2 is a block diagram of the mixing system of FIG. 1.

Referring to FIG. 2 is the piece forming operation 200. The ingredient batch 210 is where the composite material to form the solid food pieces are added, combined in a mixing operation, and then emulsified 220. The composite material is vacuumized 230 to reduce included air bubbles. The initial ingredient temperatures range from 1.5° C. to about 100° C. based on the average temperature of the ingredients before they are added to the ingredient batch 210. Some ingredients may be added while still frozen while others may be heated before adding to the ingredient batch, thereby creating the range of initial ingredient temperatures. The vacuumized batch 230, which may range from a liquid to paste in consistency, is passed through an extruder 240, then through a single or multiple steam tunnel(s) 250 to form the solid food piece. Alternatively, the extruded material may be passed through other heating/cooking devices such as a baking oven, a heated hold-tube, a heated bath, a fryer. The solid food piece may then pass through a cooling tunnel 255 and shaper 260, before being conveyed via a transfer line 261 to the next step in the process. Other ingredients 270, such as flavor aids, spices, nutrients, vitamins, or other ingredients can be added to the system via an alternative conveyance system 271.

Figure 3:
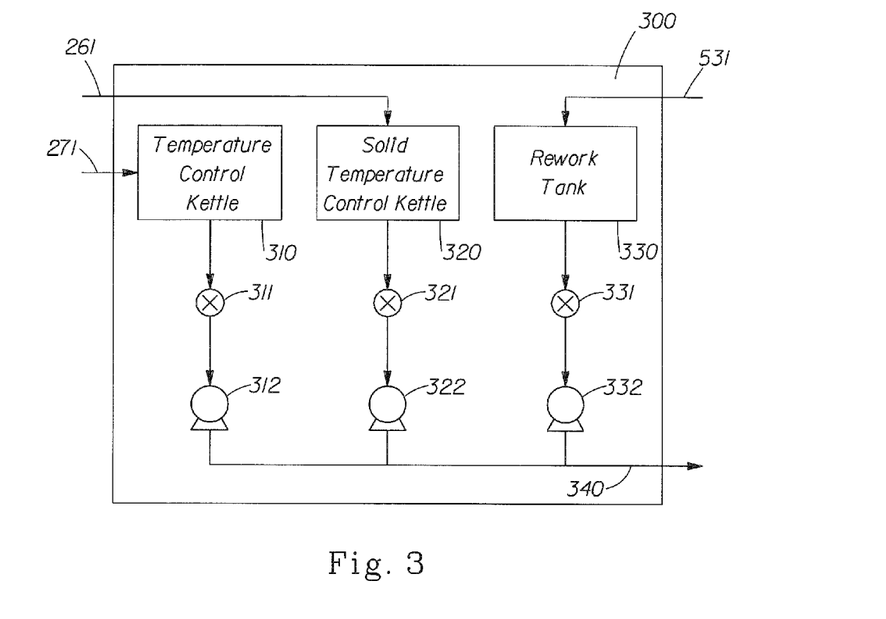
FIG. 3 is a block diagram of the meat forming system of FIG. 1.

Referring to FIG. 3 is illustrated the mixing system 300 is designed for the further mixing of liquid ingredients such as fillers, carrier fluids, gravies or sauce ingredients in a temperature controlled kettle 310. Several batches of solid food pieces can be combined in another temperature controlled kettle 320 via line 261. Any rework material that was processed outside of either high or low control limits, can be transferred back into the mixing operation via line 531 into a rework tank 330 specifically intended to hold rework material that were improperly processed. The combination of liquids, solid food pieces, and rework material is accomplished through a series of flow control valves, 311, 321, and 331 and positive displacement pumps 312, 322, and 332. The liquid, solid food pieces, and reworked material, hereafter called food composition is sent to the sterilization system via transfer line 340. The food composition may be pumped between 3 kPa to 300,000 kPa pressure with a flow rate of about 1 Lpm to 1000 Lpm from the mixing tank to the sterilization system.

Figure 4:
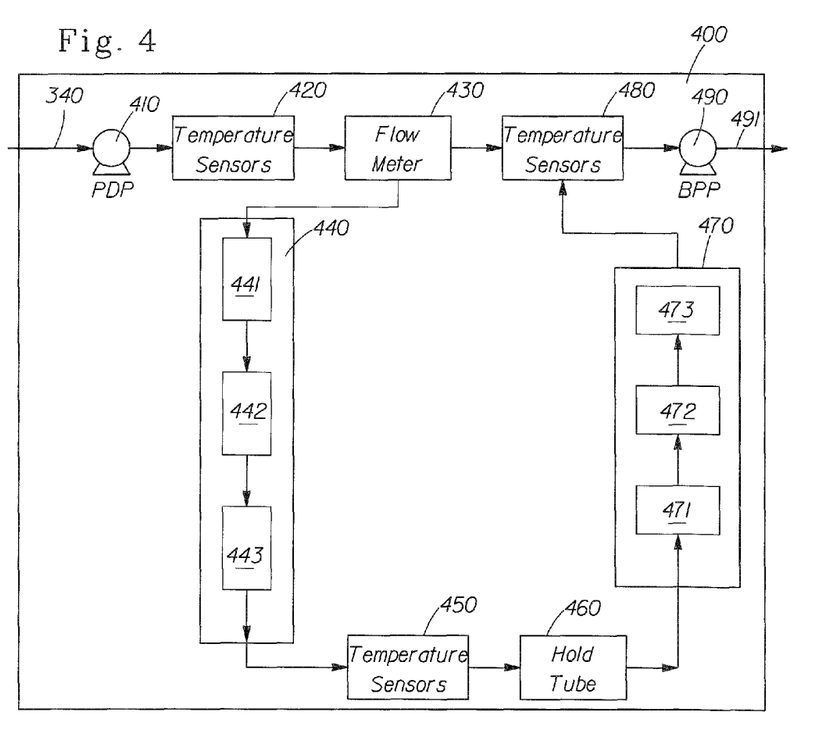
FIG. 4 is a block diagram of the sterilization system of FIG. 1.

Referring to FIG. 4 sterilization system 400 starts with a positive displacement pump 410 which pumps the food composition through a temperature sensor 420 a flow meter 430, and into a sterilization system 440 that contains one or more ohmic heating units 441, 442, and 443. These heating units could be a bank of one to three ohmic heaters. An example of an ohmic heater that can be used in the sterilization system of the present invention is a 60 kW ohmic heating units, manufactured by Emmepiemme SRL, Piacenza, Italy. The residence time in each ohmic heating unit may be between about 1 and 60 seconds. Current flowing through the each ohmic heating unit could range from about 0.05 amps to about 120 amps. The wattage for each ohmic heating unit typically could range from about 1 kW to about 75 kW and the voltage can range from about 5 V to about 350 V. Example target final temperatures for the first of the three ohmic heating units can be from about 50° C. to about 80° C., for the second ohmic heating unit can be from about 70° C. to about 110° C., and for the third ohmic heating unit can be from about 130° C. to about 150° C., respectively.

In an alternative embodiment, these ohmic heating units can also be replaced with other known heating systems. Examples include, but are not limited to direct steam heating chambers and wiped film heat exchangers.

The food composition then flows through a second temperature sensor 450 used to verify the composition has reached the target temperature of about 140° C. A hold tube 460 is used to provide sufficient time at elevated temperature to complete the sterilization process. The length of the hold tube is typically from about 100 cm to 1000 cm and the temperature is maintained between about 120° C. and 300° C. The residence time of the food composition in the hold tube would typically be between 5 seconds and 1000 seconds. The food composition then flows through a cooling process 470 that contains one or more heat exchangers 471, 472, and 473 designed to reduce the temperature of the food composition down to a desired lower temperature, preferably close to ambient temperature. The final temperature range can be from about 5° C. to about 100° C., but more typical final temperatures range from about 25° C. to about 70° C. An appropriate example of a heat exchanger designed to cool the product down to the desired exit temperature is an APV scraped surface heat exchanger, manufactured by APV Crepaco, Inc. This temperature is measured by a temperature sensor 480. At the end of this operation, the food composition flows through a back-pressure pump 490 used to maintain a positive pressure throughout the sterilization process, and then is conveyed to the flow diversion operation via a transfer line 491.

Figure 5:
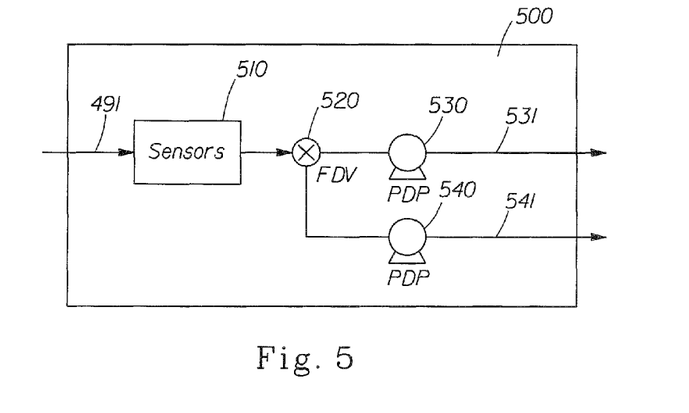
FIG. 5 is a block diagram of the recirculation system of FIG. 1.

Referring to FIG. 5, the recirculation system 500 starts with a series of sensors 510. Non-limiting examples of in-line process sensors include temperature, pressure, flow, and metal. The food composition passing through the sensors that is outside of predetermined required control limits of the sterilization process is pumped through the flow diversion valve 520 via a positive displacement pump 530 and passes through a transfer pipe 531 to rework tank 330, shown in FIG. 3. The food composition meeting control limits of the installed process flow through the flow diversion valve 520, and using pump 540, conveyed through pipe 541 to the next processing step. Non-limiting examples of control parameters include Volume 0.001 ml to about 16 ml, temperature (275° C. to 350° C.) ranges, and electro-conductivity (0.5 Siemens/m to 9 Siemens/m).

Figure 6:
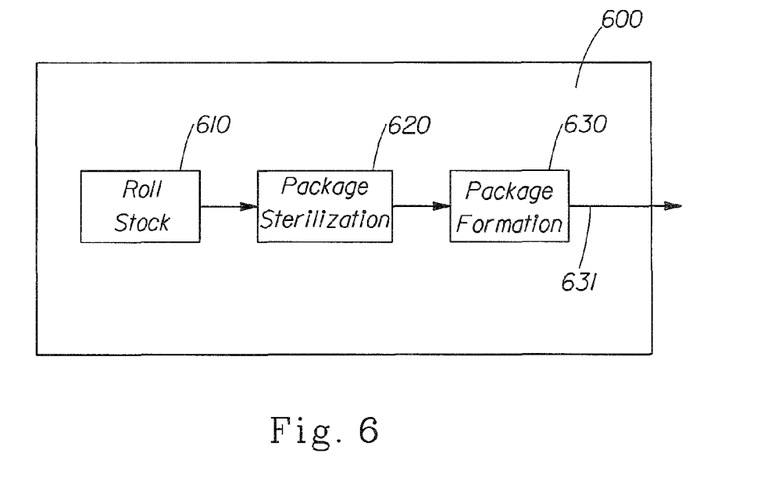
FIG. 6 is a block diagram of the package system of FIG. 1

Referring to FIG. 6, the package sterilization system 600 starts with package roll stock 610 proceeding through a sterilization operation 620, and then enters a sterile environment under a positive back pressure. The roll stock is the formed or shaped into a product container via a forming process 630 and transported by conveyor 631 to the next step.

Figure 7:
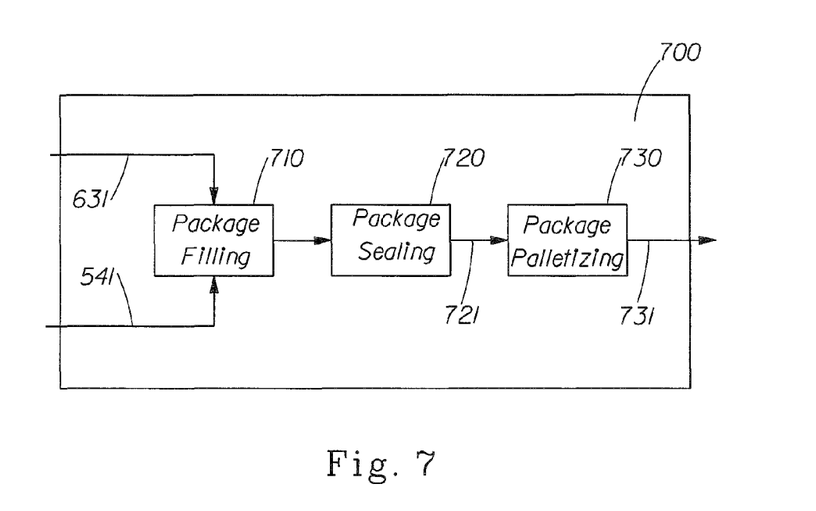
FIG. 7 is a block diagram of the aseptic filling system of FIG. 1.

Referring to FIG. 7, the package filling system 700 contains a package filler device 710 wherein the sterile package is filled with the sterile product in a sterile environment. The package is then moved to a package sealer 720 for sealing. After sealing, the finished product exits the sterile environment via transfer line 721 where it then goes to a palletizer 730. Completed products are put into cases and stacked on pallets to be sent via a transfer system 731 to warehousing and ultimately, distributed to stores.

Food Kit

The present invention can also comprise a food kit. The food kit of the present invention can comprise: a food composition preferably sterilized by a sterilizing process designed to be used in an aseptic process. The food composition prepared by a method of sterilizing comprising the steps of: introducing a food composition to an initial temperature from about 1.5° C. to about 100° C.; transferring said food composition into an heating unit; passing an electric current through said composition; maintaining a power to mass flow rate range through said heating unit from about 125 kJoules/kg to about 750 kJoules/kg; adjusting a flow rate to maintain said food composition temperature from about 75° C. to about 175° C.; and cooling said food composition to a final temperature from about 5° C. to 100° C.

The food composition can be packaged in a single container, separate containers, dual compartment containers and combinations thereof.

The food kit can comprise a pet kit, a baby kit, treat kit, human kit, and combinations thereof. The food kit may further comprise an additional food composition in a full size, a sample size or both. The food kit may further comprise an additional food composition that coordinates with the food composition that is comprised within a container.

For, example if the food composition contained in a container is a dry pet food, the coordinating pet composition may be for a gravy. As well, if the food composition in the container is a pet composition, the coordinating pet composition may be a probiotic, or vitamin, or raw hide, or treats, or chews. As well, if the food composition in a container is a pet composition, the coordinating pet composition may be a filler. As well, if the food composition in a container is a baby composition, the coordinating baby composition may be fruit, or vegetables, or juice. The food kit may further comprise a coupon, rebate, or advertisement.

The food kit may further comprise a set of instructions. These instructions may also include illustrations.

Article of Commerce

The present invention encompasses articles of commerce. The article of commerce comprising: a container comprising a food composition prepared by a method of sterilizing comprising the steps of: introducing a food composition to an initial temperature from about 1.5° C. to about 100° C.; transferring said food composition into an heating unit; passing an electric current through said composition; maintaining a power to mass flow rate range through said heating unit from about 125 kJoules/kg to about 750 kJoules/kg; adjusting a flow rate to maintain said food composition temperature from about 75° C. to about 175° C.; and cooling said food composition to a final temperature from about 5° C. to 100° C.

The efficacy of the current invention can be linked to the ability of the consumer to understand the usage instructions and to use the product accordingly. The article of commerce can further comprise a set of instructions in association with the container which instruct a consumer to carry out the methods of the present invention. The method for dispensing the food composition comprising the instructions to open the container, transfer the food composition from the container and close the container. These instructions may comprise illustrations. Additionally, the food composition comprises a composite material having a particle volume is from about 0.001 ml to about 16 ml.

Food Compositions

Nonlimiting examples of dry food compositions may optionally contain on a dry matter basis, from about 1% to about 50% crude protein, from about 0.5% to about 25% crude fat, from about 1% to about 10% supplemental fiber, and from about 1% to about 30% moisture, all by weight of the food composition. Alternatively, a dry food composition may contain on a dry matter basis, from about 5% to about 35% crude protein, from about 5% to about 25% crude fat, from about 2% to about 8% supplemental fiber, and from about 2% to about 20% moisture, all by weight of the food composition. Alternatively, the dry food composition contains on a dry matter basis, a minimum protein level of about from about 9.5% to about 22%, a minimum fat level of from about 8% to about 13%, a minimum moisture level of from about 3% to about 8%, a minimum supplemental fiber level of from about 3% to about 7%, all by weight of the food composition. The dry animal composition may also have a minimum metabolizable energy level of about 3.5 Kcal/g.

Nonlimiting examples of a semi-moist food composition may optionally contain on a dry matter basis, from about 0.5% to about 50% crude protein, from about 0.5% to about 25% crude fat, from about 0.5% to about 15% supplemental fiber, from about 30% to about 50% moisture, all by weight of the food composition. Alternatively, the semi-moist food compositions may contain on a dry matter basis, from about 5% to about 35% crude protein, from about 5% to about 25% crude fat, from about 1% to about 5% supplemental fiber, and from about 35% to about 45% moisture, all by weight of the food composition. Alternatively, the semi-moist food composition may have on a dry matter basis, a minimum protein level of about from about 9.5% to about 22%, a minimum fat level of from about 8% to about 13%, a minimum moisture level of about 38% to about 42%, a minimum supplemental fiber level of from about 2% to about 3%, all by weight of the food composition. The semi-moist food composition may also have a minimum metabolizable energy level of about 3.5 Kcal/g and from about 0.1% to about 20% ash, and from about 0.001% to about 5.0% taurine.

Nonlimiting examples of a moist food composition may optionally contain on a dry matter basis, from about 0.5% to about 50% crude protein, from about 0.5% to about 25% crude fat, from about 0.01% to about 15% supplemental fiber, from about 50% to about 90% moisture, all by weight of the food composition. Alternatively, the moist food compositions may contain on a dry matter basis, from about 5% to about 35% crude protein, from about 5% to about 25% crude fat, from about 0.05% to about 5% supplemental fiber, and from about 60% to about 85% moisture, all by weight of the food composition. Alternatively, a moist animal food composition may contain on a dry matter basis, a minimum protein level of about from about 9.5% to about 22%, a minimum fat level of from about 8% to about 13%, a moisture level of from about 65% to about 80%, a minimum supplemental fiber level of from about 0.1% to about 3%, all by weight of the food composition. The moist food composition may also have a minimum metabolizable energy level of about 1.0 Kcal/g and from about 0.1% to about 20% ash, and from about 0.001% to about 5.0% taurine.

In one embodiment of the present invention, the food composition is an food composition, whether dry, moist, semi-moist or otherwise, that comprises on a dry matter basis, from about 5% to about 50%, alternatively 20% to about 50% of animal-derived ingredients, by weight of the food composition. Non-limiting examples of animal-derived ingredients include chicken, beef, pork, lamb, turkey (or other animal) protein or fat, egg, fishmeal, and the like.

Where the food composition is in the form of a gravy, the composition may comprise at least 10% of a broth, or stock, non-limiting examples of which include vegetable beef, chicken or ham stock. Typical gravy compositions may comprise on a dry matter basis, from about 0.5% to about 5% crude protein, and from about 2% to about 5% crude fat.

Where the food composition is in the form of a supplement composition such as biscuits, chews, and other treats, the supplement may comprise, on a dry matter basis, from about 20% to about 60% protein, from about 22% to about 40% protein, by weight of the supplement composition. As another example, the supplement compositions may comprise, on a dry matter basis, from about 5% to about 35% fat, or from about 10% to about 30% fat, by weight of the supplement composition. Food and supplement compositions intended for use by animals such as cats or dogs are commonly known in the art.

An additional embodiment of a food composition that would be processed using the system detailed in FIG. 1-FIG. 7 may comprise by weight of the food composition, about 40 to about 60% meat or composite material, from about 0 to about 15% vegetables, from about 0 to about 30% textured plant proteins, and from about 0 to about 15% pasta or cereal grains. The food composition would have a Total Moisture Content of from about 65% to about 99% total moisture; from about 1% to about 5% fat, from about 8% to abut 20% protein, and from 1 to about 2.5% carbohydrates, on a dry matter basis.

Optional Ingredients

The food composition of the present invention can further comprise a wide range of other optional ingredients.

Nonlimiting examples of optional ingredients include wheat protein, soy protein, lupin protein, protein flour, textured wheat protein, textured soy protein, textured lupin protein, textured vegetable protein, breading, comminuted meat, flour, comminuted pasta, pasta, water, flavorants, starches, seasoning salts, time-release compounds, minerals, vitamins, antioxidants, prebiotics, probiotics, aroma modifiers, flavor modifiers, and combinations thereof.

Also useful herein, as an optional ingredient, is one or more colorants. Nonlimiting examples of colorants include, but are not limited to, synthetic or natural colorants, and any combination thereof. A colorant can be malt for brown coloring, titanium dioxide for white coloring, or tomato extract (e.g. lycopene) for red coloring, alalpha (e.g. chlorophyll) for green coloring, algal meal for green coloring, caramel for brown coloring, annatto extract (e.g. bixin, transbixin, and norbixin and combinations thereof) for about yellow-orange color, dehydrated beets for about red-purple coloring, ultramarine blue for about blue-green color, β-carotene for about orange coloring, tagetes (e.g. lutein) for about orange coloring, tumeric for about yellow coloring, tumeric oleoresin for about yellow coloring, saffron for about yellow coloring, corn gluten meal for about yellow coloring, paprika for about red coloring, paprika oleoresin for about orange-red coloring, black iron oxide for about black coloring, brown iron oxide for about brown coloring, red iron oxide for about red coloring, yellow iron oxide for about yellow coloring, red cabbage for about red-purple coloring, carbon black for about black coloring, cochineal extract for about red coloring, carrot oil for about yellow coloring, FD&C Blue No. 1 (Brilliant Blue) for about green-blue coloring, FD&C Blue No. 2 (Indigotine) for about a deep blue coloring, FD&C Green No. 3 (Fast Green) for about blue-green coloring, FD&C Red No. 3 (Erythrosine) for about blue-red coloring, FD&C Red No. 40 (Allura Red) for about yellow-red coloring, FD&C Yellow No. 5 (Tartrazine) for about lemon-yellow coloring, FD&C Yellow No. 6 (Sunset Yellow) for about red-yellow coloring, fruit juice concentrate for inherent coloring (e.g. orange juice concentrate for about orange coloring), grape color extract for red-blue coloring, xanthophylls (e.g. extracted from broccoli) for about green coloring, vegetable juice for inherent coloring (e.g. beet juice for red-purple coloring), riboflavin for about green-yellow coloring, Orange B for about orange coloring, and octopus and squid ink for about black coloring The food composition comprises from about 0.00001% to about 10%, by weight of the product, of said colorant. Preferably food composition comprises from about 0.0001% to about 5%, more preferably from about 0.001% to about 1%, even more preferably from about 0.005% to about 0.1%, by weight of the composition, of said colorant.

Methods

Density Method

This method measures density of the food composition, composite material, solid food pieces, large particles, small particles and/or particulates. Density is assessed via immersion in distilled water at 21.5° C. using, for example, a Density Determination Kit available from Mettler-Toledo, Inc. Columbus, Ohio, USA.

The apparatus for measuring density of the composite material, solid food pieces, large particles, small particles and/or particulates via immersion in a fluid is described herein. An analytical balance, precise to at least 0.001 g, has the top loading balance pan removed. Affixed on the balance pan is the frame. If the analytical balance is equipped with a guard along the perimeter of the pan, the guard is removed as to not interfere with placement of the pan and frame on the balance load cell. The pan and frame assembly are placed on the balance load cell. A platform is placed astraddle the pan and not touching the frame or the pan. A beaker (e.g. 500 ml) is filled with 21.5° C. distilled water (e.g. 500 ml). The beaker and water are placed on the platform in a manner to not touch the frame, preferably centered. Two sample stages are used in this step. The upper sample stage (upper stage) is affixed at the upper center and horizontal portion of the frame. The lower sample stage (lower stage) should be submerged to a depth sufficient so that when a sample is placed on the lower stage the sample is submerged completely. A thermometer is affixed along the inside wall of the beaker. Once equilibrated, the temperature of the distilled water is recorded from the thermometer. The analytical balance is tared.

If need be, beaker size, scale size, and water depth can be adjusted for composite material, solid food pieces, large particles, small particles and/or particulates weight and different sizes.

i. Non-Floating Composite Material, Solid Food Pieces, Large Particles, Small Particles and/or Particulates The composite material, solid food pieces, large particles, small particles and/or particulates weight is determined when placed at each stage location. Using forceps with minimal grasping force, the heterogeneous and/or homogenous particles are placed on the upper sample stage. The weight is recorded as the Weight of the composite material, solid food pieces, large particles, small particles and/or particulates in Air (A). Using forceps with minimal grasping force, the composite material, solid food pieces, large particles, small particles and/or particulates is removed from the upper sample stage, the analytical balance is tared, and the composite material, solid food pieces, large particles, small particles and/or particulates is placed on the lower sample stage so that the composite material, solid food pieces, large particles, small particles and/or particulates is completely submerged and is freely resting on the lower sample stage. The composite material, solid food pieces, large particles, small particles and/or particulates are positioned to be freely resting on the lower sample stage so that all weight is carried by the lower sample stage. If the composite material, solid food pieces, large particles, small particles and/or particulates remain on the lower sample stage, the weight of the composite material, solid food pieces, large particles, small particles and/or particulates in Distilled Water (W) is recorded.

ii. Floating Composite Material, Solid Food Pieces, Large Particles, Small Particles and/or Particulates If the composite material, solid food pieces, large particles, small particles and/or particulates float to the surface, the composite material, solid food pieces, large particles, small particles and/or particulates are removed from the distilled water. The lower sample stage is replaced with a buoyant body sample stage. The buoyant body sample stage is perforated to allow trapped air to float to the surface of the water but with perforations smaller than the composite material, solid food pieces, large particles, small particles and/or particulates. When the buoyancy of the composite material, solid food pieces, large particles, small particles and/or particulates is greater than the weight of the buoyancy body sample stage, the buoyant body sample stage must be weighted by placing an additional weight on top of the upper stage such that the buoyant body sample stage, the upper stage with weight, and frame act as one unit with no moving parts. Tare the balance and conduct the density measurement as above (i) for composite material, solid food pieces, large particles, small particles and/or particulates. A new composite material, solid food pieces, large particles, small particles and/or particulates is chosen, and the step is repeated to determine and record the Weight of the composite material, solid food pieces, large particles, small particles and/or particulates in Air (A) on the upper sample stage, the balance is tared, and then subsequent weight immersed (W), where W is now a negative number and is recorded as such.

The density of distilled water at 21.5° C. is 0.99788 g/ml based on standard pressure conditions of 1 atmosphere from E. W. Lemmon, M. O. McLinden and D. G. Friend, "Thermophysical Properties of Fluid Systems" in NIST Chemistry WebBook, NIST Standard Reference Database Number 69, Eds. P. J. Linstrom and W. G. Mallard, March 2003, National Institute of Standards and Technology, Gaithersburg Md., 20899(http://webbook.nist.gov).

Composite material, solid food pieces, large particles, small particles and/or particulates density is calculated as follows:

composite material, solid food pieces, large particles, small particles and/or particulates density (g/ml)=Density of distilled water×[(A)/(A−W)]

Volume Method

Volume is calculated based on the first principle relationship to density and mass. Using the values obtained from the Density Method discussed previously one can calculate the Volume of the composite material, solid food pieces, large particles, small particles and/or particulates as described in the Density Method.

Volume is calculated as follows:

composite material, solid food pieces, large particles, small particles and/or particulates Volume (ml)= (A) (g)/composite material, solid food pieces, large particles, small particles and/or particulates density (g/ml)

Electro-Conductivity Method

Electro-Conductivity is the physical property of a food composition including composite material, solid food pieces, large particles, small particles and/or particulates and filler that determines its ability to conduct electricity and is expressed in Siemens per meter (Siemens/m). This physical property is temperature dependent, and must be measured across a range of temperatures to determine the interdependence of conductivity on temperature for a given food composition. To determine the electro-conductivity of, a food composition, composite material, solid food pieces, large particles, small particles and/or particulates and filler are heated to specific temperatures, ranging from 5° C. up to 85° C. Exact temperatures, voltages and electrical current (amps) are noted according to the procedure described below. The conductivity is calculated based on voltage, current, and sample dimensions according to the equation described below, and then plotted versus recorded temperature to generate a conductivity versus temperature curve. An example of an appropriate experimental method and measuring device for determining electro-conductivity of a food composition is described below (Tulsiyan, P., M. S. Dissertation, Ohio State University, Columbus, Ohio, 2005).

Figure 8:
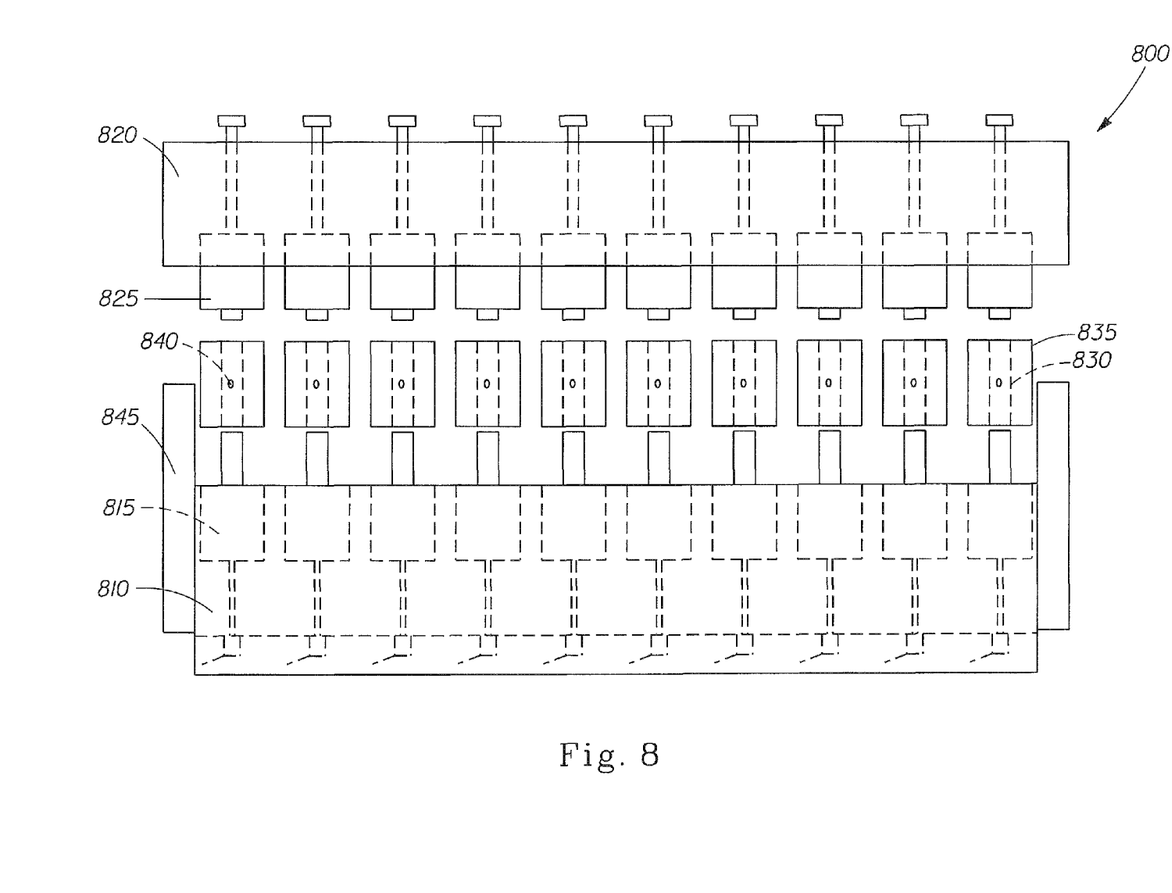
FIG. 8 is a cut away diagram of an electro-conductivity measuring device.

The electro-conductivity measuring device 800 using ohmic heating units (441, 442 and 443) are shown in FIG. 8. A base 810 made from acetal was constructed in which ten electrodes 815 are hosed. The electrodes are made of titanium and coated with platinum. A top 820 constructed of aluminum contains 10 electrodes 825. The ohmic heating units 835 are constructed of an amorphous thermoplastic polyetherimide, Ultem™, (GE Plastics, Pittsfield, Mass., USA). These units 835 have a cylindrical sample chamber 830 through their center which could then be sandwiched between the base 810 and top electrodes 825. A thermocouple opening 840 is provided at the center of the unit 835 to enable temperature measurements. Acrylic Plexiglas™ sidebars 845 are screwed to the acetal base 810 to support the aluminum top 820.

Figure 9:
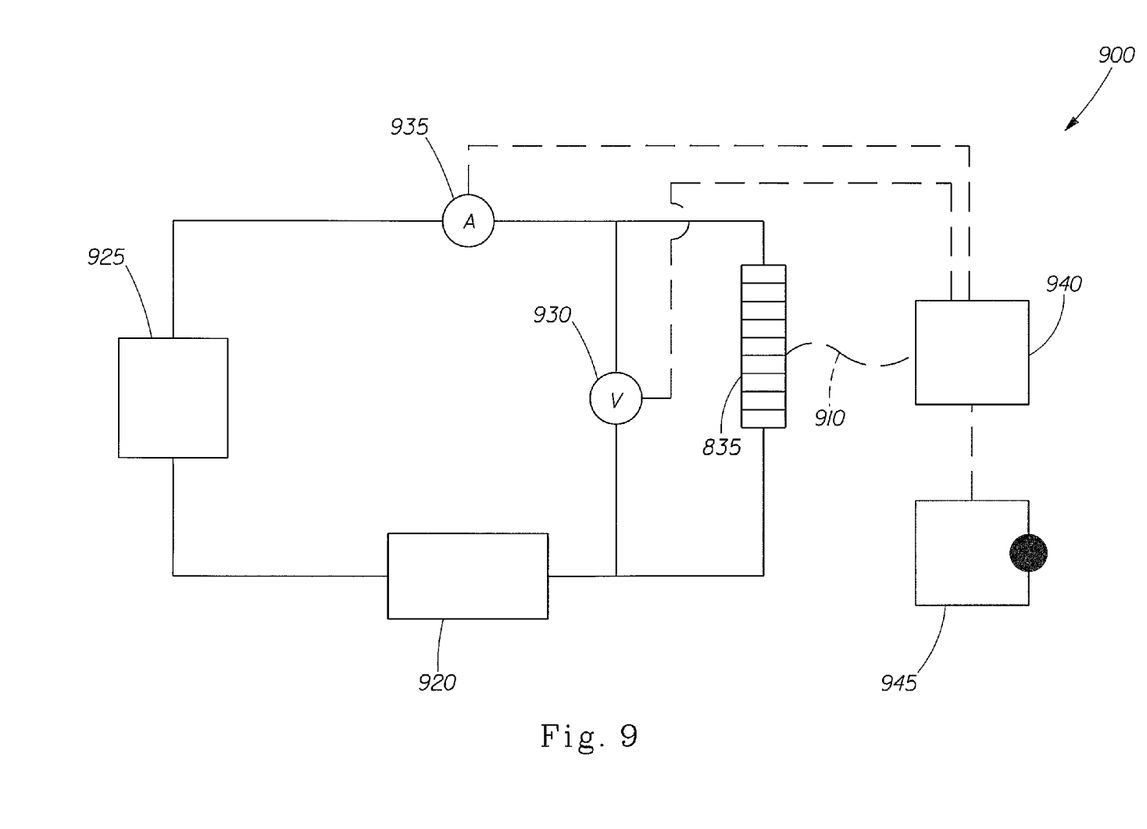
FIG. 9 is an electrical schematic diagram of the electro-conductivity measuring device.

The schematic wiring diagram 900 is shown in FIG. 9. A thermocouple 910 (Cleveland Electric Laboratories, Twinsburg, Ohio, USA) is used to measure the temperature of the sample at the geometric center of the solid food piece, or in the case of filler, at the geometric center of the heating unit 835. The ohmic units 835 were connected to a relay switch 920, which is connected to a power source 925, controlling the order in which units 835 are heated. Voltage 930 (Ohio Semitronics, Hilliard, Ohio, USA) and current 935 (Keithley Instruments Inc., Cleveland, Ohio, USA) transducers are used to measure the voltage across the samples and the current flowing through them. A data logger 940 (Campbell Scientific Inc., Logan, Utah, USA) linked to a computer 945 is used to obtain the voltage, current and temperature data at constant time intervals. In this manner, ten food samples could be of operation at above atmospheric pressure, so that electro-conductivity can be measured under sterilization temperatures.

Cylindrical solid samples are prepared using a slicer and a set of cork borers. Samples are cut to 0.79 mm in length, and 0.78 mm in diameter, which are the same dimensions as the sample chamber. Samples are blanched in water at 100° C. for 7 minutes to preshrink them to prevent shrinkage during ohmic heating, which in turn could lead to a loss of contact with the electrodes. The samples are placed in the sample chamber in the heating units and sandwiched between the electrodes. A thermocouple is then inserted into the unit through the thermocouple port and each sample is heated to 140° C. using alternating current of 60 Hz and voltage generally between 15 V to 25 V. In some cases, higher voltages are needed to reach the required temperature. This requirement is due to higher than normal conductivity of the sample. The temperature, voltage, and current are measured continuously and recorded using the data logger linked to the computer.

Liquid samples, such as filler, gravies, broths, and oils are poured into the sample chamber to test their conductivity up to 140° C., via ohmic heating using the same procedure as for solid samples.

The electro-conductivity of the samples is calculated using the dimensions of the unit, voltage, and current, using the formula:

$$\sigma = LI/AV$$

where,
$\sigma$=electro-conductivity of the sample (S/m)
L=Length of the sample (m)
I=Current flowing through the sample (A)
A=Cross sectional area of the sample (m$^2$)
V=Voltage across sample (V)

The electro-conductivity is plotted against temperature to yield its electro-conductivity-temperature curve. The curves of all samples of a component are plotted on the same graph to understand variations involved in its electro-conductivity. The accuracy of each electrode set is also tested by calculating the electro-conductivity of three different calibration salt solutions (conductivity standard solutions 0.8974 S/m, 1.2880 S/m, and 1.5000 S/m, Oakton Instruments, Vernon Hills, Ill., USA). The maximum difference between the measured and the reference value for any heating cell is ~8.5%. The temperature at the center of the sample is used as the representative value, and is assumed to be spatially uniform because of the small size of the sample.

Thermal Conductivity/Resistivity

Thermal Conductivity is the physical property of a food composition which determines its ability to conduct heat and is expressed in Watts/meter ° C.

The thermal conductivity (K) and resistivity (R) of composite material, solid food pieces, large particles, small particles and/or particulates were measured using a Decagon Devices Thermal Property Meter (Pullman, Wash., USA), Model KD2 under standard conditions. The KD2 measures thermal conductivity and resistivity at the same time from one measurement.

The sensor needle of the KD2 is inserted completely into each of the composite material, solid food pieces, large particles, small particles and/or particulates. This sensor needle contains both a heating element and a thermistor for monitoring the temperature of the sample. The controller module contains a battery, a 16-bit microcontroller/AD converter, and power control circuitry. When the instrument is activated, it first equilibrated for 30 seconds to ensure temperature stability of the sample. After equilibrating, the device automatically begins its 30-second heating cycle which is controlled by the device's microprocessor. The heating cycle is immediately followed by a 30 second cooling/monitoring cycle. The KD2 measures the changing temperature during the 30 second cooling cycle, and stores the data within the microprocessor. At the end of the cooling cycle, the meter computes the thermal conductivity resistivity the composite material, solid food pieces, large particles, small particles and/or particulates and this data is recorded.

The KD2 meter automatically calculates its values for thermal conductivity (K) and resistivity (R) by monitoring the dissipation of heat from a line heat source. Thermal conductivity can be calculated by the following equation;

$$K = Q \times L / (A \times \Delta T)$$

where
K=Thermal Conductivity ($W\ m^{-1}C^{-1}$),
Q=heat flow rate (W),
L=distance (m),
A=area ($m^2$),
$\Delta T$=Temperature difference)(C.°).

Thermal resistivity (R) is the reciprocal of thermal conductivity and describe by the equation;

$$R = l/k$$

where
R=Thermal resistivity ($m^2 C/W$),
l=represents the thickness of the material (m),
K=represents the conductivity of the material (W/mC), The exact equations theory used by the KD2 can be found in the *KD2: Thermal Properties Analyzer User's Manual* version 1.7 (Decagon Devices, 2006, p 17-20) and are based on the following:

$$K = q/4\pi m$$

where
K=Thermal conductivity of the medium ($W\ m^{-1}C-1$),
q=Known power supplied to the heater,
m=Slope in the change in temperature) (C.°).

Viscosity Method

The Shear Index (n) and Consistency Value (K) are known and accepted means for reporting the viscosity profile of liquids having a viscosity that varies with applied shear rate using a Power Law model. This method applies to rheological characterization of the filler including as gravies, sauces, oils, broths, melted fats and solutions of irreversible gels.

The viscosity ($\eta$) can be measured by applying a shear stress and measuring the shear rate using a rheometer, such as a TA Instruments AR2000 (TA Instruments, New Castle, Del., USA 19720). Viscosity is determined at different shear rates in the following manner.

Samples are obtained from a food composition as follows: i) for fillers at room temperature, the filler fraction is separated as the composition passes through a US#20 sieve (A.S.T.M.E. specification, 850 mm square opening). To catch the filler passing through the US#20 sieve, a plastic bag is fitted loosely between the US#20 sieve and the Pan (solid non-perforated full-height pan). Minimal force is preferred to promote separation using the US#20 sieve; however for viscous filler (greater than 1 Pa-s at 25° C. and a shear rate of 0.2 inverse seconds (1/sec)), a 1 minute cycle with the Ro-Tap (as above, in the Abrasion Test) is employed. The filler is collected in the plastic bag-lined Pan below the US#20 sieve, the plastic bag removed with filler, and sealed to prevent moisture loss.

For measurement, a 40 mm diameter parallel plate geometry with a gap of 1.25 mm is used unless there are components greater than 0.25 mm, in which case a gap of 2.5 mm is used. Using a spatula, a filler sample is loaded onto the rheometer base plate which is at 25° C., the gap is obtained, and excess filler sample outside the top measurement geometry is removed, locking the top plate in position during the removal of excess sample. The filler sample is equilibrated to the base plate temperature for 2 minutes. A preshear step is performed comprising 15 seconds of shear at a shear rate of 50 inverse seconds (1/sec). As is known to one skilled in the art, the shear rate with a parallel plate geometry is expressed as the shear rate at the edge, which is also the maximum shear rate. After the preshear step, the measurement is performed, which comprises ramping the stress from 0.01 Pa to 1,000 Pa over a 5.0 minute interval at 25° C., while collecting 125 viscosity data points, in an evenly spaced linear progression. A shear rate of at least 300 1/seconds is obtained in the test, or the test is repeated with a fresh filler sample of the same component with a higher final stress value, maintaining the same rate of stress increase per time, until a shear rate of at least 300 1/sec is obtained during the measurement period. During the measurement, observe the sample to make certain the area under the top parallel plate is not evacuated of sample at any location during the measurement, or the measurement is repeated until a sample remains for the duration of the test. The results are fitted to the power law model by selecting only the data points between 10-300 1/sec shear rate, viscosity in Pa-s, shear rate in 1/sec, and using a least squares regression of the logarithm of viscosity vs. the logarithm of shear rate to obtain values of K and n according to the Power Law equation:

$$\eta = K(\gamma')^{(n-1)}$$

The value obtained for the log-log slope is (n−1) where n is the Shear Index (dimensionless) and the value obtained for K is the Consistency Value, expressed in units of Pa-s$^n$.

Total Moisture Content Method

The method involves the analysis of the total moisture content in the food composition. The analysis is based on the procedure outlined in AOAC method 930.15 and AACC method 44-19.

A food composition sample is prepared by taking one unit volume, for example, 375 gram of the composition, and homogenizing in a food processor to a uniform consistency like a paste. A food composition larger than 375 gram would be subdivided to create equal and representative fractions of the whole such that a 375 gram sample is obtained.

The paste of the food composition is individually sampled in triplicate at a volume less than or equal to 100 ml and placed individually sealed in a 100 ml Nasco Whirl-Pak® (Fort Atkinson, Wis. 53538-0901). During the process of sealing the Whirl-Pak®, excess air is evacuated manually from the container just prior to final closure thereby minimizing the container headspace. The Whirl-Pak® is closed per manufacturer's instructions—tightly folding the bag over three (3) times and bending the tabs over 180 degrees. All samples are refrigerated at 6° C. for less than 48 h prior to moisture analysis.

For total moisture analysis, the tare weight of each moisture tin and lid are recorded to 0.0001 g. Moisture tins and lids are handled using dry and clean forceps. Moisture tins and lids are held dry over desiccant in a sealed desiccator. A Whirl-Pak® containing a sample is unfolded and a 2.0000+/− 0.2000 gram sample is weighed into the uncovered moisture tin. The weight of the sample in the moisture tin is recorded. The lid is placed atop the moisture tin in an open position to allow moisture loss but contain all other material during air oven drying. The lid and moisture tin loaded with sample are placed in an air oven operating at 135° C. for 6 h. Time is tracked using a count-down timer.

After drying, the tin is removed from the oven and the dried lid is placed atop the tin using forceps. The covered moisture tin with dried sample is placed immediately in a desiccator to cool. The sealed desiccator is filled below the stage with active desiccant. Once cool to room temperature, the covered moisture tin with dried sample is weighed to 0.0001 g and weight recorded. The total moisture content of each sample is calculated using the following formula:

Total Moisture Content (%)=100−(weight of tin, lid and sample after drying−empty tin and lid weight)×100/initial sample weight.

EXAMPLES

The following examples further describe and demonstrate embodiments within the scope of the invention. The examples are given solely for the purpose of illustration and are not to be construed as limitations of the present invention, as many variations thereof are possible without departing from the spirit and scope of the invention.

| Food Composition | Ex. 1 | Ex. 2 | Ex. 3 | Ex. 4 | Ex. 5 | Ex. 6 | Ex. 7 | Ex. 8 |
|---|---|---|---|---|---|---|---|---|
| (Z) Water | 6.28 | 3.32 | 14.65 | 6.25 | 6.28 | | | |
| (Y) Chicken, comminuted | 53.95 | 28.53 | 66.93 | 53.68 | 53.9 | | | |
| (Z) Textured Wheat Protein | | 32.57 | | | | | | |
| (Y) Beef | 23.49 | 12.42 | | | | | | |
| (Y) Salmon | | | | 23.38 | | | | |
| (Y) Kangaroo | | | | | 23.5 | | | |
| (Z) Carrots | | 6.86 | | | | | | |
| (Z) Peas | | 4.52 | | | | | | |
| (Z) Dehydrated Potato | | 3.18 | | | | | | |
| (X) Animal Plasma APC, Inc. Ames, IA | 4.28 | 2.26 | 4.68 | 4.26 | 4.27 | | | |
| (X) Beet Pulp | 3.523 | 1.863 | 3.648 | 3.506 | 3.52 | | | |
| (X) Calcium Carbonate | 1.60 | 0.846 | 1.67 | 1.59 | 1.60 | | | |
| (X) Sodium Tripolyphosphate Astaris, St. Louis, Mo | 1.25 | 0.66 | 1.37 | 1.24 | 1.25 | | | |
| (X) L-Lysine | 0.811 | 0.429 | 1.040 | 0.807 | 0.81 | | | |
| (X) Potassium Chloride | 0.806 | 0.426 | 0.881 | 0.802 | 0.81 | | | |
| (X) Choline Chloride | 0.528 | 0.279 | 0.516 | 0.525 | 0.53 | | | |
| (X) Vitamins | 0.487 | 0.257 | 0.504 | 0.485 | 0.49 | | | |
| (X) Onion Powder | 0.374 | 0.198 | 0.394 | 0.373 | 0.37 | | | |
| (X) Trace Minerals | 0.371 | 0.196 | 0.375 | 0.370 | 0.37 | | | |
| (X) Salt | 0.362 | 0.191 | 0.375 | 0.360 | 0.36 | | | |
| (Y) Fish Oil | 1.005 | 0.532 | 1.256 | 1.000 | 1.01 | | | |
| (X) DL-Methionine | 0.096 | 0.051 | 0.162 | 0.096 | 0.10 | | | |
| (X) Garlic Powder | 0.125 | 0.066 | 0.197 | 0.125 | 0.13 | | | |
| (Y) Mixed Tocopherols | 0.071 | 0.037 | 0.070 | 0.070 | 0.07 | | | |
| (X) Iron Chelate 20% Albion, UT | 0.061 | 0.032 | 0.069 | 0.060 | 0.06 | | | |
| (X) Citric Acid | QS | QS | QS | QS | QS | | | |
| (X) Celery Powder | | | 0.134 | | | | | |
| Dried Cod | | | | | | 100 | | |
| Beef Jerky | | | | | | | 100 | |
| Broiled Duck Breast | | | | | | | | 100 |
| Colorant | | | | | | | | |
| (X) FD&C Yellow 5 | | | | 0.83 | | | | |
| (X) FD&C Red 40 | | | | 0.17 | 0.08 | | | |
| (X) Titanium dioxide powder | | | 1.05 | | | | | |
| (X) Malt | 0.50 | 0.27 | | | 0.50 | | | |
| Total Moisture Content | | | | | | | | 23.4 |

| | Ex. 9 | Ex. 10 | Ex. 11 | Ex. 12 | Ex. 13 | Ex. 14 | Ex. 15 |
|---|---|---|---|---|---|---|---|
| (Z) Water | 7.49 | 17.57 | 25.72 | 37.95 | | | |
| (X) Spray Dried Beef Broth | 0.51 | 0.45 | 0.41 | 0.34 | | | |
| (Y) CHICKEN, Comminuted | 62.86 | 56.01 | 50.47 | 42.16 | | | |
| (Y) Beef | 16.25 | 14.48 | 13.04 | 10.90 | | | |
| (X) Gaur Gum Ph-8/24 Tic Gums, Belcamp, MD | 0.42 | 0.38 | 0.34 | 0.28 | | | |
| (X) TICAXAN Xanthan Powder TIC Gums, Belcamp, MD | 0.039 | 0.035 | 0.031 | 0.026 | | | |
| (X) Animal Plasma APC, Inc. Ames, IA | 3.25 | 2.90 | 2.61 | 2.18 | | | |
| (X) Beet Pulp | 2.437 | 2.172 | 1.957 | 1.635 | | | |
| (X) Calcium Carbonate | 0.886 | 0.790 | 0.712 | 0.594 | | | |
| (X) Sodium Tripolyphosphate Astaris, St. Louis, MO | 1.66 | 1.48 | 1.33 | 1.11 | | | |
| (X) L-Lysine | 0.145 | 0.129 | 0.116 | 0.097 | | | |
| (X) Potassium Chloride | 0.552 | 0.492 | 0.443 | 0.370 | | | |
| (X) Vitamins | 0.479 | 0.427 | 0.384 | 0.321 | | | |

-continued

| | | | | |
|---|---|---|---|---|
| (X) Onion Powder | 0.284 | 0.253 | 0.228 | 0.191 |
| (X) Trace Minerals | 0.296 | 0.264 | 0.237 | 0.198 |
| (X) Salt | 0.474 | 0.422 | 0.381 | 0.318 |
| (Y) Fish Oil | 0.374 | 0.334 | 0.301 | 0.251 |
| (X) DL-Methionine | 0.129 | 0.115 | 0.104 | 0.086 |
| (X) Garlic Powder | 0.095 | 0.084 | 0.076 | 0.064 |
| (Y) Mixed Tocopherols | 0.047 | 0.042 | 0.038 | 0.032 |
| (X) Citric Acid | QS | QS | QS | QS |
| (X) Dried Egg Product Colorant | 0.650 | 0.579 | 0.522 | 0.436 |
| (X) Caramel | 0.005 | 0.004 | 0.004 | 0.003 |
| (X) Malt | 0.65 | 0.58 | 0.53 | 0.44 |

| | | | | | | | |
|---|---|---|---|---|---|---|---|
| Diced mackerel | | | | | 100 | | |
| Diced beef (B) | | | | | | 50.0 | |
| Diced chicken (C) | | | | | | QS | 100 |
| Total | 105.6 | 118.4 | 131.4 | 157.3 | 58.72 | 117.4 | 58.72 |
| Total Moisture Content | 61.8 | 65.9 | 69.3 | 74.3 | | 53.50 (B); 72.54 (C) | 72.54 |

Examples 1-5 and 9-12

Examples 1-6 and 9-12 can be made in the following manner. All ingredients of Type (X) can be prepared as a dry batch by conventional dry blending. Animal protein (salmon, kangaroo, beef, chicken) ingredients of Type (Y) can be frozen until use and ground using a conventional meat grinder through a 9.5 millimeter diameter hole grinding plate. All ingredients of Type (Y) can be prepared as a wet batch by conventional mixing, the temperature not exceeding 0° C. during mixing. Mix Type (X) dry batch and all Type (Z) ingredients into Type (Y) wet batch using conventional mixing techniques; the temperature not exceeding 0° C. during mixing. Hereafter the Meat Slurry is the X+Y+Z mixture.

The Meat Slurry can be shaped to form ropes measuring 15.8 mm×15.8 mm×1000 mm using an extruder with an extrusion die plate and an orifice measuring 15.8 mm×15.8 mm. Extrusion equipment (Selo Food Technology B.V., Holland, or equivalent) can be integrated for continuous and sequential use with a belt equipped steam tunnel (Selo Food Technology B.V., Holland, or equivalent).

Examples 1, 2, 3, 4, and 5 can use various animal and plant protein sources to comprise heterogeneous particles. Further Example 2 can use of vegetables in the heterogeneous particles.

Examples 6, 7, and 8 can use various ingredients that can comprise, but are not limited to, the homogeneous or heterogeneous particles. The method and preparation of these ingredients are common to the industry that supplies these ingredients.

Examples 9-12 can use hydrocolloid and/or gum systems to manage moisture content in the heterogeneous particle; these systems or combinations thereof are non-limiting.

Examples 6-8, 13-15

Examples 6, 7, 8, 13, 14, and 15 can use a commodity source of animal protein as homogeneous or heterogeneous particles. Mackerel, beef, or chicken are diced using commercial slicing/dicing equipment into solid food pieces with a Volume of 2 ml.

Examples 16-24

| Example # | Product Type | Piece Volume (mL) | Electro-Conductivity (S/m) | Density (g/ml) | Moisture Content (% w/w) | Thermal Conductivity W/mC | pH |
|---|---|---|---|---|---|---|---|
| 16 | Chicken | 0.015 | .75 | 0.9 | 68 | .46 | 4.1 |
| 17 | Beef | 0.025 | .75 | 0.95 | 70 | .47 | 4.5 |
| 18 | Fish | 0.010 | 1.8 | 0.96 | 66 | .45 | 4.5 |
| 19 | Chicken | 0.60 | 1.2 | 1.05 | 85 | .52 | 4.8 |
| 20 | Beef | 1.50 | 1.5 | 1.01 | 82 | .51 | 5.2 |
| 21 | Fish | 0.30 | 2 | 1.03 | 79 | .50 | 5.2 |
| 22 | Chicken | 15 | .8 | 1.1 | 45 | .38 | 5.5 |
| 23 | Beef | 16 | 1 | 1.06 | 50 | .40 | 6.0 |
| 24 | Fish | 12 | 2 | 1.09 | 55 | .42 | 5.8 |

Examples 16, 19, and 22 are the physical properties that can be used to make the compositions of the present invention comprising composite material comprising food pieces where the composite materials comprises chicken in largest amount.

Examples 17, 20, and 23 are the physical properties that can be used to make the compositions of the present invention comprising composite material comprising food pieces where the composite materials comprises beef in largest amount.

Examples 18, 21, and 24 are the physical properties that can be used to make the compositions of the present invention comprising composite material comprising food pieces where the composite materials comprises fish in largest amount.

The natural pH range for chicken-based products is about 5.5 to 6.4, for beef-based products about 5.3 to 6.2, and for fish products about 6.1 to 8.2. However, it is not uncommon to use acidic materials to lower the pH of products as a means to enhance stability, flavor, texture, etc. Other ingredients may also affect the pH of the product, including fruits and vegetables which tend to have natural pH's as follows; carrots about 4.9 to 6.3, tomatoes about 3.9 to 4.7, and beets about 4.9 to 5.8.

| Example Number | Average Voltage | Unit 1 Amperage | Unit 2 Amperage | Unit 3 Amperage | Average Power (KW) | Flow Rate (L/min) | Power/Mass Flowrate (kJ/kg) |
|---|---|---|---|---|---|---|---|
| 25 | 156.7 | 90.4 | 85.3 | 78.7 | 39.9 | 5.34 | 448.5 |
| 26 | 137.1 | 92.7 | 82.2 | 72.8 | 34.0 | 5.19 | 393.4 |
| 27 | 132.4 | 91.7 | 80.0 | 70.3 | 32.0 | 5.15 | 372.9 |

| Example Number | Product Initial Temperature (C.) | Product Temperature Exiting Heater (C.) | Product Final Temperature, C. | Hold Tube Residence Time | Pump Pressure (kPa) (psi) |
|---|---|---|---|---|---|
| 25 | 23.3 | 137.2 | 20.5 | 2.69 | 396 |
| 26 | 24.1 | 143.8 | 21.7 | 2.77 | 410.3 |
| 27 | 24.5 | 142.9 | 25.8 | 2.79 | 415.8 |

Examples 25-27 are examples of typical conditions that can be used to sterilize the food compositions described in Examples 1-24.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

All parts, ratios, and percentages herein, in the Specification, Examples, and Claims, are by weight and all numerical limits are used with the normal degree of accuracy afforded by the art, unless otherwise specified.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of sterilizing a food composition, comprising:
   (a) introducing a food composition to an initial temperature from about 1.5° C. to about 100° C.;
   (b) transferring said food composition into an heating unit;
   (c) passing an electric current through said composition;
   (d) maintaining a power to food composition mass flow rate range through said heating unit from about 200 kJoules/kg to about 600 kJoules/kg;
   (e) adjusting a food composition flow rate to maintain said food composition temperature from about 75° C. to about 175° C. and higher than the initial temperature: and
   (f) cooling said food composition to a final temperature from about 5° C. to 100° C.

2. The method of claim 1, wherein said initial temperature is from about 1.5° C. to about 75° C.

3. The method of claim 1, wherein said initial temperature is from about 2.0° C. to about 50° C.

4. The method of claim 1, wherein said initial temperature is from about 3.0° C. to about 30° C.

5. The method of claim 1, wherein said initial temperature is from about 4.0° C. to about 25° C.

6. The method of claim 1, wherein said initial temperature is from about 5.0° C. to about 15° C.

7. The method of claim 1, wherein said power to food composition mass flow rate range through said heating unit from about 300 kJoules/kg to about 500 kJoules/kg.

8. The method of claim 1, wherein said power to food composition mass flow rate range through said heating unit from about 350 kJoules/kg to about 460 kJoules/kg.

9. The method of claim 1, wherein said food composition flow rate is from about 1 Lpm to about 1000 Lpm.

10. The method of claim 1, wherein said composition has a specific gravity from about 0.85 to about 1.25.

11. The method of claim 1, the food composition further comprising a filler; wherein said filler has an electro-conductivity.

12. The method of claim 11, wherein said filler is selected from the group consisting of gravy, gel, jelly, aspic, water, sauce, broth, gas, extracts, brine, soup, steam, and combinations thereof.

13. The method of claim 1, wherein said composition further comprises a composite material having a Volume from about 0.001 ml to about 16 ml.

14. The method of claim 13, wherein said composite material is selected from the group consisting of solid food pieces, large particles, small particles, particulates and combinations thereof.

15. The method of claim 13, wherein said composite material is selected from the group consisting of animal protein, plant protein, farinaceous matter, vegetables, fruits, dough, fat, oils, binding agents, and combinations thereof.

16. The method of claim 1, wherein the food composition further comprises a component selected from the group consisting of flavorants, seasonings, salts, colorants, time-release compounds, minerals, vitamins, antioxidants, prebiotics, probiotics, aroma modifiers, and combinations thereof.

* * * * *